United States Patent
Inadome et al.

(10) Patent No.: US 11,905,404 B2
(45) Date of Patent: Feb. 20, 2024

(54) RESIN COMPOSITION, CURED PRODUCT THEREOF, FIBRE-REINFORCED PLASTIC, AND FIBRE-REINFORCED PLASTIC FLAMEPROOFING METHOD

(71) Applicant: ADEKA CORPORATION, Tokyo (JP)

(72) Inventors: Masato Inadome, Kuki (JP); Naohiro Fujita, Kuki (JP); Kazuhide Morino, Kuki (JP); Chihiro Asakura, Kuki (JP)

(73) Assignee: ADEKA CORPORATION, Tokyo (JP)

( * ) Notice: Subject to any disclaimer, the term of this patent is extended or adjusted under 35 U.S.C. 154(b) by 595 days.

(21) Appl. No.: 17/254,587

(22) PCT Filed: Jun. 27, 2019

(86) PCT No.: PCT/JP2019/025651
§ 371 (c)(1),
(2) Date: Dec. 21, 2020

(87) PCT Pub. No.: WO2020/009001
PCT Pub. Date: Jan. 9, 2020

(65) Prior Publication Data
US 2021/0163733 A1 Jun. 3, 2021

(30) Foreign Application Priority Data
Jul. 4, 2018 (JP) ................ 2018-127672

(51) Int. Cl.
| | | |
|---|---|---|
| C08L 63/00 | (2006.01) | |
| C07F 9/54 | (2006.01) | |
| C08J 5/04 | (2006.01) | |
| C08L 79/04 | (2006.01) | |
| C08J 5/24 | (2006.01) | |

(52) U.S. Cl.
CPC ............ *C08L 63/00* (2013.01); *C07F 9/5463* (2013.01); *C08J 5/042* (2013.01); *C08J 5/243* (2021.05); *C08J 5/249* (2021.05); *C08L 79/04* (2013.01); *C08J 2363/00* (2013.01); *C08J 2379/04* (2013.01); *C08J 2463/00* (2013.01); *C08J 2479/04* (2013.01)

(58) Field of Classification Search
CPC ....... C08L 63/00; C08L 63/04; C08K 5/0066; C08K 5/5313; C08K 5/5398; C08K 5/5399; C07F 9/5463
USPC ........................................ 524/538
See application file for complete search history.

(56) References Cited

U.S. PATENT DOCUMENTS

| | | | |
|---|---|---|---|
| 10,557,002 B2 * | 2/2020 | Fujita | .................. C08G 59/5033 |
| 2018/0037014 A1 * | 2/2018 | Endo | ..................... H05K 1/0373 |
| | | | 525/122 |
| 2018/0251612 A1 * | 9/2018 | Fujita | .................. C08G 59/5033 |

FOREIGN PATENT DOCUMENTS

| | | |
|---|---|---|
| JP | 2000-80251 | 3/2000 |
| JP | 2006-291098 | 10/2006 |
| JP | 2009-074019 A | 4/2009 |
| JP | 2011-52165 | 3/2011 |
| JP | 2018-44069 | 3/2018 |
| WO | 2015/025904 | 2/2015 |
| WO | 2016/121750 | 8/2016 |
| WO | 2016/152839 | 9/2016 |
| WO | 2017/038603 | 3/2017 |

OTHER PUBLICATIONS

International Search Report for PCT/JP2019/025651, dated Aug. 6, 2019, 4 pages.

* cited by examiner

*Primary Examiner* — Arrie L Reuther
*Assistant Examiner* — Olga Lucia Donahue
(74) *Attorney, Agent, or Firm* — NIXON & VANDERHYE

(57) ABSTRACT

Provided is a resin composition that is capable of producing a cured product having excellent environmental suitability, high strength, and excellent flame retardancy, and that is suitably usable as a matrix resin for fiber-reinforced plastics. A resin composition contains (A) an epoxy resin, (B) a cyanate resin, (C) an aromatic amine curing agent that is liquid at 25° C., and (D) a phosphorus-containing compound represented by formula (1). Preferably, in formula (1), $R^1$ and $R^2$ each independently represent an alkyl group or an aryl group, and X and Y are an oxygen atom.

20 Claims, No Drawings

RESIN COMPOSITION, CURED PRODUCT THEREOF, FIBRE-REINFORCED PLASTIC, AND FIBRE-REINFORCED PLASTIC FLAMEPROOFING METHOD

This application is the U.S. national phase of International Application No. PCT/JP2019/025651 filed 27 Jun. 2019, which designated the U.S. and claims priority to JP Patent Application No. 2018-127672 filed 4 Jul. 2018, the entire contents of each of which are hereby incorporated by reference.

TECHNICAL FIELD

The present invention relates to a resin composition suitably usable as a matrix resin for fiber-reinforced plastics, a cured product of the resin composition, a fiber-reinforced plastic manufactured by using the resin composition, and a method for flame-proofing a fiber-reinforced plastic by using the resin composition.

BACKGROUND ART

It is known to use a resin composition containing an epoxy resin and a cyanate resin as a matrix resin for fiber-reinforced plastics. For example, Applicant has previously proposed a resin composition for fiber-reinforced plastics that contains an epoxy resin having a specific structure, a cyanate resin, and an aromatic amine curing agent that is liquid at 25° C. (see Patent Literature 1). This fiber-reinforced-plastic resin composition is capable of producing a cured product having excellent heat resistance, large stretching-displacement, and excellent flexibility.

It is also known to use halogen-based flame retardants, such as bromine-based flame retardants and chlorine-based flame retardants, or phosphorus-based flame retardants as flame retardants usable in resin compositions for fiber-reinforced plastics (see Patent Literature 2). Applicant has also previously proposed an epoxy resin composition containing an epoxy resin and a phosphorus-containing compound having a specific structure (see Patent Literature 3). This epoxy resin composition is capable of producing a cured product having excellent flame retardancy.

CITATION LIST

Patent Literature

Patent Literature 1: WO 2017/038603
Patent Literature 2: JP 2009-74019A
Patent Literature 3: WO 2016/121750

SUMMARY OF INVENTION

Technical Problem

The cured product of the resin composition disclosed in Patent Literature 1, however, has room for improvement in terms of flame retardancy.

The technique disclosed in Patent Literature 2 generates hazardous hydrogen halide gas when combusting the fiber-reinforced plastic containing a halogen-based flame retardant. This increases environmental burden, and is thus problematic from an environmental perspective. Further, phosphorus-based flame retardants conventionally used in this technical field are incapable of imparting sufficient flame retardancy to resin compositions containing an epoxy resin and a cyanate resin.

The technique disclosed in Patent Literature 3 is capable of producing a cured product having excellent flame retardancy. The document, however, describes nothing about using the phosphorus-containing compound, which has a specific structure, in resin compositions containing an epoxy resin and a cyanate resin. Further, the document describes nothing about imparting excellent flame retardancy to cured products by using the phosphorus-containing compound.

The present invention relates to providing a resin composition that is capable of producing a cured product having excellent environmental suitability, high strength, and excellent flame retardancy, and that is suitably usable as a matrix resin for fiber-reinforced plastics.

Solution to Problem

As a result of diligent research to solve the aforementioned problems, Inventors have found that the aforementioned problems can be solved by employing, in combination, an epoxy resin, a cyanate resin, a liquid aromatic amine curing agent, and a specific phosphorus-containing compound, thus arriving at the present invention.

The present invention relates to a resin composition containing: (A) an epoxy resin; (B) a cyanate resin; (C) an aromatic amine curing agent that is liquid at 25° C.; and (D) a phosphorus-containing compound represented by formula (1) below.

[Chem. 1]

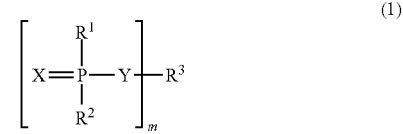

(In formula (1), m represents an integer from 1 to 10; $R^1$ and $R^2$ each independently represent an alkyl group, an aryl group, or $-NR^4R^5$; $R^4$ and $R^5$ each independently represent a hydrogen atom, an alkyl group, or an aryl group; in cases where $IV$ and $R^2$ are both $-NR^4R^5$, $R^4$s may be the same or different from one another, and $R^5$s may be the same or different from one another; $R^3$ represents a hydrocarbon group, wherein the hydrocarbon group may contain an atom selected from the group consisting of oxygen, sulfur, phosphorus, and nitrogen; X represents an oxygen atom or a sulfur atom; Y represents an oxygen atom, a sulfur atom, or $-NR^6-$; and $R^6$ represents a hydrogen atom, an alkyl group, or an aryl group.)

Advantageous Effects of Invention

The present invention can provide a resin composition that is capable of producing a cured product having excellent environmental suitability, high strength, and excellent flame retardancy, and that is suitable as a matrix resin for fiber-reinforced plastics.

DESCRIPTION OF EMBODIMENTS

First, a resin composition of the invention will be described. The resin composition of the invention contains an epoxy resin. For the epoxy resin contained in the resin composition of the invention, any known epoxy resin having two or more epoxy groups per molecule can be used without particular limitation, and the molecular structure, molecular weight, etc., thereof are not particularly limited. It is preferable to select, as appropriate, epoxy resin(s) from among known epoxy resins depending on the use of the resin composition.

Examples of epoxy resins may include: bisphenol-type epoxy resins, such as bisphenol A-type epoxy resins and bisphenol F-type epoxy resins; biphenyl-type epoxy resins, such as biphenyl-type epoxy resins and tetramethylbiphenyl-type epoxy resins; dicyclopentadiene-type epoxy resins; naphthalene-type epoxy resins; alicyclic epoxy resins obtained from, for example, cyclohexanedimethanol or hydrogenated bisphenol A; novolac-type epoxy resins, such as phenol novolac-type epoxy resins, cresol novolac-type epoxy resins, bisphenol A novolac-type epoxy resins, an epoxidized product of a condensate of a phenol and an aromatic aldehyde having a phenolic hydroxyl group, and biphenylnovolac-type epoxy resins; triphenylmethane-type epoxy resins; tetraphenylethane-type epoxy resins; dicyclopentadiene/phenol adduct-type epoxy resins; phenol aralkyl-type epoxy resins; epoxy compounds containing a glycidylamino group, such as N,N-diglycidylaniline, bis(4-(N-methyl-N-glycidylamino)phenyl)methane, diglycidyl ortho-toluidine, N,N-bis(2,3-epoxypropyl)-4-(2,3-epoxypropoxy)-2-methylaniline, N,N-bis(2,3-epoxypropyl)-4-(2,3-epoxypropoxy)aniline, and N,N,N',N'-tetra(2,3-epoxypropyl)-4,4'-diaminodiphenylmethane; and epoxidized products of cyclic olefin compounds, such as vinylcyclohexene diepoxide, dicyclopentadiene diepoxide, 3,4-epoxycyclohexylmethyl-3,4-epoxycyclohexane carboxylate, 3,4-epoxy-6-methylcyclohexylmethyl-6-methylcyclohexane carboxylate, and bis(3,4-epoxy-6-methylcyclohexylmethyl)adipate. One type of the aforementioned epoxy resin may be used singly, or two or more types may be used in combination.

In the resin composition of the invention, it is preferable that the epoxy resin contains a compound represented by formula (I) below. By using an epoxy resin containing a compound represented by formula (I), it is possible to obtain a cured product with physical properties such as large stretching-displacement and excellent flexibility, and, in cases where the resin composition of the invention is used in combination with a fiber material, the resin can follow the stretching of the fibers, thereby being able to provide a fiber-reinforced plastic having high strength.

1,2-propylene and 1,3-propylene, a butylene group such as 1,2-butylene, 1,3-butylene and 1,4-butylene, and a pentylene group such as 1,5-pentylene.

In the resin composition of the invention, from the viewpoint of the cross-linking density of the cured product, it is preferable that a and b in formula (I) each independently represent a number from 3 to 7, more preferably a number from 4 to 6. By setting a and b within the aforementioned range, a cured product with excellent flexibility and strength can be obtained. In cases where the epoxy resin contains two or more types of compounds represented by formula (I) in which a and/or b are/is different from one another, a and b are average values of the two or more types of compounds represented by formula (I).

In the resin composition of the invention, it is preferable that c in formula (I) is a number from 0 to 2, more preferably a number from 0 to 1. By setting c within the aforementioned range, the viscosity of the resin can be suppressed from increasing, thereby resulting in an improvement in workability of the resin composition. In cases where the epoxy resin contains two or more types of compounds represented by formula (I) in which the value of c is different from one another, c is the average value of the two or more types of compounds represented by formula (I). The value of c in the compound represented by formula (I) can be determined according to the same method as that for determining a and b, as described above.

In the resin composition of the invention, from the viewpoint of easy availability of materials, it is preferable that $R^{11}$ and $R^{12}$ in formula (I) each independently represent a divalent hydrocarbon group having from 2 to 4 carbon atoms.

The epoxy resin in the resin composition of the invention preferably contains a compound wherein $R^{13}$ in formula (I) is $-C(CH_3)_2-$, i.e., preferably contains a diglycidyl ether of bisphenol A-propylene oxide adduct. By containing a diglycidyl ether of bisphenol A-propylene oxide adduct, it is possible to obtain a cured product having large stretching-displacement and excellent heat resistance and flexibility. It is preferable that the content of the diglycidyl ether in the epoxy resin is from 20 to 80 mass %, more preferably from 30 to 70 mass %, even more preferably from 40 to 60 mass %. By setting the content of the diglycidyl ether within the aforementioned range, it is possible to obtain a cured product having excellent curing properties and an excellent balance between heat resistance and flexibility.

[Chem. 2]

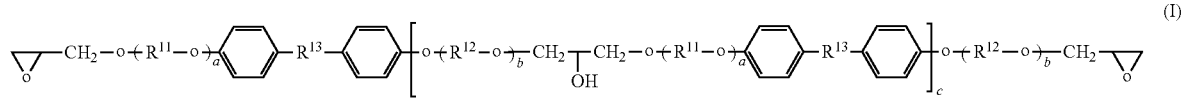

(I)

In formula (I), a and b each independently represent an integer from 2 to 10; c represents an integer from 0 to 3; $R^{11}$ and $R^{12}$ each independently represent a divalent hydrocarbon group having from 2 to 5 carbon atoms; and $R^3$ represents a single bond, a methylene group, or $-C(CH_3)_2-$.

Examples of the divalent hydrocarbon group having from 2 to 5 carbon atoms represented by $R^{11}$ and $R^{12}$ may include alkylene groups having from 2 to 5 carbon atoms, including, for example, an ethylene group, a propylene group such as Compounds represented by formula (I) can be manufactured according to known methods. For example, they can be manufactured according to the method described in WO2017/038603.

The resin composition of the invention contains a cyanate resin. The molecular structure, molecular weight, etc., of the cyanate resin are not particularly limited, and known cyanate resins can be used. Concrete examples may include: novolac-type cyanate resins; and bisphenol-type cyanate resins such as bisphenol A-type cyanate resins, bisphenol E-type cyanate resins, and tetramethyl bisphenol F-type cyanate resins.

In the present invention, it is preferable that the cyanate resin contains at least two cyanate groups (OCN) per molecule. More specifically, it is preferable to use a compound represented by formula (4-1) or (4-2) below, or a prepolymer thereof.

[Chem. 3]

$$NCO-R^b-R^a-R^c-OCN \quad (4\text{-}1)$$

In formula (4-1), $R^a$ represents a divalent hydrocarbon group; and $R^b$ and $R^c$ each independently represent a phenylene group, wherein the phenylene group may be substituted by 1 to 4 alkyl groups.

[Chem. 4]

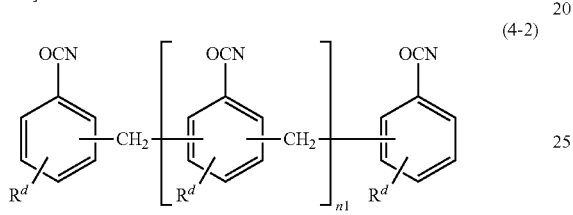

(4-2)

In formula (4-2), n1 represents an integer from 1 to 10; and $R^d$ represents a hydrogen atom or an alkyl group having from 1 to 4 carbon atoms.

Examples of the divalent hydrocarbon group represented by $R^a$ in formula (4-1) may include: alkanediyl groups, such as methylene, ethylene, propylene, ethanediyl, and octanediyl; and groups represented by formulas (5-1) to (5-8) below.

Examples of the alkyl group that may substitute the phenylene group represented by $R^b$ and $R^c$ in formula (4-1) may include alkyl groups having from 1 to 10 carbon atoms, such as methyl, ethyl, propyl, isopropyl, butyl, isobutyl, tert-butyl, amyl, isoamyl, hexyl, isohexyl, octyl, 2-ethylhexyl, tert-octyl, nonyl, and decyl.

Examples of the alkyl group having from 1 to 4 carbon atoms represented by $R^d$ in formula (4-2) may include alkyl groups having from 1 to 4 carbon atoms among the groups exemplified above as alkyl groups having from 1 to 10 carbon atoms.

In the resin composition of the invention, it is preferable that the cyanate resin contains a compound represented by formula (4-1) from the viewpoint of workability, and the compound represented by formula (4-1) is more preferably a compound represented by formula (4-3) below.

[Chem. 5]

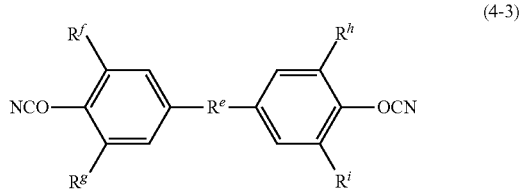

(4-3)

In formula (4-3), $R^e$ represents a group selected from the group consisting of a single bond, a methylene group, —CH(CH$_3$)—, —C(CH$_3$)$_2$—, and groups represented by formulas (5-1) to (5-8) below; and $R^f$, $R^g$, $R^h$ and $R^i$ each independently represent a hydrogen atom or an alkyl group having from 1 to 4 carbon atoms.

[Chem. 6]

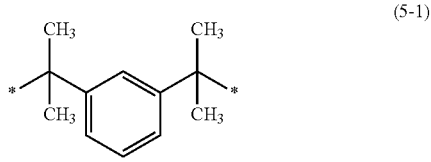

(5-1)

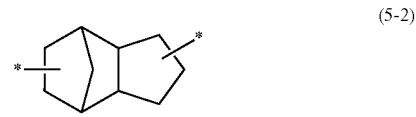

(5-2)

(5-3)

(5-4)

—S—

(5-5)

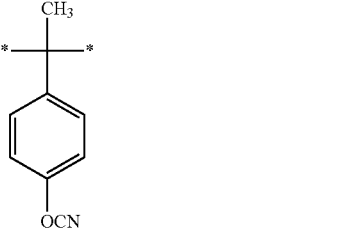

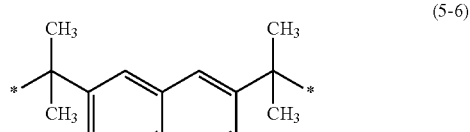

(5-6)

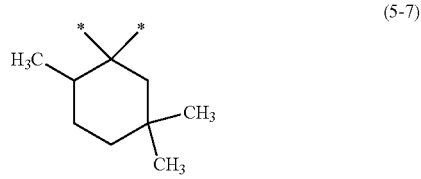

(5-7)

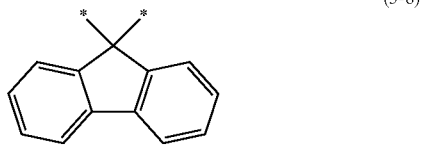

(5-8)

In formula (5-3), m1 represents an integer from 4 to 12. In formulas (5-1) to (5-8), * represents a bonding site.

In the resin composition of the invention, one type of the aforementioned cyanate compound may be used singly as the cyanate resin, or two or more types may be used in combination.

In the resin composition of the invention, the content of the cyanate resin is preferably from 10 to 200 parts by mass, more preferably from 30 to 150 parts by mass, even more preferably from 50 to 120 parts by mass, with respect to 100 parts by mass of the epoxy resin (A). According to a resin composition wherein the content of the cyanate resin is within the aforementioned range, it is possible to obtain a cured product having excellent strength and adhesion to a base material.

The resin composition of the invention contains an aromatic amine curing agent that is liquid at 25° C. By containing this aromatic amine curing agent, a cured product of the resin composition of the invention will have high strength. For the aromatic amine curing agent, any compound can be used without particular limitation, so long as the compound is liquid at 25° C., and an amino group is directly provided to an aromatic ring. Concrete examples of the aromatic amine curing agent may include aromatic diamine compounds. Examples of aromatic diamine compounds may include: diphenylmethanes, such as diaminodimethyldiphenylmethane and diaminodiethyldiphenylmethane; and diaminobenzenes, such as diaminodiethyltoluene, 1-methyl-3,5-bis(methylthio)-2,4-benzene diamine, and 1-methyl-3,5-bis(methylthio)-2,6-benzene diamine. In the resin composition of the invention, one type of the aforementioned aromatic amine curing agent may be used singly, or two or more types may be used in combination.

Particularly, in the resin composition of the invention, from the viewpoint of easy availability and excellent physical properties of the cured product, it is preferable to use a diphenylmethane compound, and more preferably diaminodiethyldiphenylmethane, as the aromatic diamine compound.

In the resin composition of the invention, the content of the aromatic amine curing agent that is liquid at 25° C. is preferably from 40 to 90 parts by mass with respect to 100 parts by mass of the epoxy resin. By setting the content of the aromatic amine curing agent within the aforementioned range, the resin composition can be cured efficiently, and a cured product having excellent physical properties can be obtained.

The resin composition of the invention contains a phosphorus-containing compound represented by formula (1) below. The phosphorus-containing compound represented by formula (1) is reactive with an epoxy group, and is used as a flame retardant. According to the resin composition of the invention containing a phosphorus-containing compound represented by formula (1), it is possible to obtain a cured product having high strength and excellent flame retardancy.

[Chem. 7]

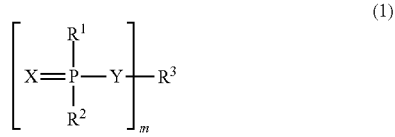

(1)

In formula (1), m represents an integer from 1 to 10; $R^1$ and $R^2$ each independently represent an alkyl group, an aryl group, or —$NR^4R^5$; $R^4$ and $R^5$ each independently represent a hydrogen atom, an alkyl group, or an aryl group; in cases where $R^1$ and $R^2$ are both —$NR^4R^5$, $R^4$s may be the same or different from one another, and $R^5$s may be the same or different from one another; $R^3$ represents a hydrocarbon group, wherein the hydrocarbon group may contain an atom selected from the group consisting of oxygen, sulfur, phosphorus, and nitrogen; X represents an oxygen atom or a sulfur atom; Y represents an oxygen atom, a sulfur atom, or —$NR^6$—; and $R^6$ represents a hydrogen atom, an alkyl group, or an aryl group.

Examples of the alkyl group represented by $R^1$, $R^2$, $R^4$, $R^5$, and $R^6$ in formula (1) may include alkyl groups having from 1 to 10 carbon atoms, such as methyl, ethyl, propyl, isopropyl, butyl, isobutyl, tert-butyl, amyl, isoamyl, tert-amyl, hexyl, isohexyl, octyl, 2-ethylhexyl, tert-octyl, nonyl, and decyl. In the resin composition of the invention, from the viewpoint of reactivity with the epoxy resin, it is preferable that $R^1$, $R^2$, $R^4$, and $R^5$ each independently represent an alkyl group having from 1 to 6 carbon atoms, more preferably an alkyl group having from 2 to 5 carbon atoms, and even more preferably an ethyl group or a propyl group.

Examples of the aryl group represented by $R^1$, $R^2$, $R^4$, $R^5$, and $R^6$ in formula (1) may include aryl groups having from 6 to 12 carbon atoms, such as phenyl, naphthyl, and biphenyl.

The alkyl group and aryl group represented by $R^1$, $R^2$, $R^4$, $R^5$, and $R^6$ in formula (1) may have a substituent. Examples of the substituent may include a hydroxyl group, a mercapto group, a nitrile group, a carboxyl group, and halogen atoms. Examples of halogen atoms may include fluorine, chlorine, bromine, and iodine.

Examples of the hydrocarbon group represented by $R^3$ in formula (1) may include: alkyl groups, such as methyl, ethyl, propyl, isopropyl, butyl, isobutyl, tert-butyl, amyl, isoamyl, tert-amyl, hexyl, isohexyl, octyl, 2-ethylhexyl, tert-octyl, nonyl, and decyl; aryl groups, such as phenyl and naphthyl; alkanediyl groups, such as methylene, ethylene, propylene, ethanediyl, and octanediyl; alkanetriyl groups, such as methylenetriyl and 1,1,3-ethylenetriyl; alkanetetrayl groups, such as 1,1,2,2-ethylenetetrayl; and aromatic groups, such as mononuclear polyhydric phenol compounds, such as hydroquinone, resorcin, pyrocatechol and phloroglucinol, and polynuclear polyhydric phenol compounds, such as dihydroxynaphthalene, biphenol, methylene bisphenol (bisphenol F), methylene bis(o-cresol), ethylidene bisphenol, isopropylidene bisphenol (bisphenol A), isopropylidene bis(o-cresol), tetrabromobisphenol A, 1,3-bis(4-hydroxycumylbenzene), 1,4-bis(4-hydroxycumylbenzene), 1,1,3-tris(4-hydroxyphenyl)butane, 1,1,2,2-tetra(4-hydroxyphenyl)ethane, thiobisphenol, sulfonylbisphenol, oxybisphenol, phenol novolac, ortho-cresol novolac, ethylphenol novolac, butylphenol novolac, octylphenol novolac, resorcin novolac, and terpene phenol.

The hydrocarbon group represented by $R^3$ in formula (1) may contain an atom selected from the group consisting of oxygen, sulfur, phosphorus, and nitrogen. Herein, "may contain an atom selected from the group consisting of oxygen, sulfur, phosphorus, and nitrogen" means that a hydrogen atom in the hydrocarbon group is substituted by a substituent containing oxygen, sulfur, phosphorus and/or nitrogen, or a methylene group in the hydrocarbon group is substituted by a group containing oxygen, sulfur, phosphorus and/or nitrogen.

Examples of groups containing oxygen, sulfur, phosphorus and/or nitrogen for substituting a hydrogen atom in the hydrocarbon group may include a nitro group, a cyano group, a hydroxy group, an amino group, and a carboxyl group.

Examples of groups containing oxygen, sulfur, phosphorus and/or nitrogen for substituting a methylene group in the hydrocarbon group may include —O—, —S—, —CO—, —COO—, —OCO—, —COS—, —OCS—, —SO$_2$—, —SO$_3$—, —NH—, —CONH—, —NHCO—, —SO$_2$NH—, —NH—SO$_2$-, and —N=CH—.

In the resin composition of the invention, it is preferable that m in formula (1) is from 1 to 7, more preferably from 2 to 5, and even more preferably, m is 2. By setting m within the aforementioned range, it is possible to obtain a cured product having excellent physical properties such as glass transition temperature and strength, and also, it is easy to manufacture the phosphorus-containing compound represented by formula (1).

In the resin composition of the invention, from the viewpoint of reactivity with the epoxy resin and flame retardancy of the cured product, it is preferable that $R^1$ in formula (1) is an alkyl group or an aryl group, more preferably an alkyl group. From the same viewpoint, it is preferable that $R^2$ is an alkyl group or an aryl group, more preferably an alkyl group.

In the resin composition of the invention, from the viewpoint of easy availability and manufacturability, it is preferable that X and Y in formula (1) are each an oxygen atom.

In the resin composition of the invention, from the viewpoint of reactivity with the epoxy resin, it is preferable that the hydrocarbon group represented by $R^3$ in formula (1) contains at least one aromatic ring.

In the resin composition of the invention, from the viewpoint of reactivity with the epoxy resin and flame retardancy and physical properties of the cured product, it is preferable that m in formula (1) is 2, and the hydrocarbon group represented by $R^3$ is a group selected from the group consisting of formulas (2-1), (2-2), and (2-4) to (2-6) below.

[Chem. 8]

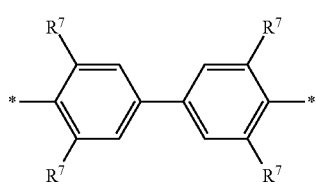

(2-1)

In formula (2-1), $R^7$ represents a hydrogen atom or an alkyl group having from 1 to 4 carbon atoms; and * represents a bonding site.

[Chem. 9]

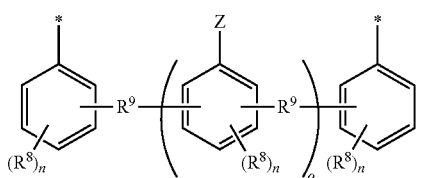

(2-2)

In formula (2-2), n represents an integer from 0 to 3; o represents an integer from 0 to 50; $R^8$ represents a hydrogen atom or an alkyl group having from 1 to 4 carbon atoms; $R^9$ represents a hydrocarbon group, wherein the hydrocarbon group may contain an oxygen atom or a sulfur atom; Z represents a hydroxyl group or a group represented by formula (2-3) below; and * represents a bonding site.

[Chem. 10]

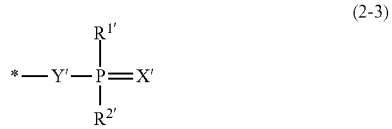

(2-3)

In formula (2-3), $R^{1'}$ and $R^{2'}$ each independently represent an alkyl group, an aryl group, or $—NR^{4'}R^{5'}$; $R^{4'}$ and $R^{5'}$ each independently represent a hydrogen atom, an alkyl group, or an aryl group; in cases where $R^{1'}$ and $R^{2'}$ are both $—NR^{4'}R^{5'}$, $R^{4'}$'s may be the same or different from one another, and $R^{5'}$'s may be the same or different from one another; $R^{3'}$ represents a hydrocarbon group, wherein the hydrocarbon group may contain an atom selected from the group consisting of oxygen, sulfur, phosphorus, and nitrogen; X' represents an oxygen atom or a sulfur atom; Y' represents an oxygen atom, a sulfur atom, or $—NR^{6'}—$; $R^{6'}$ represents a hydrogen atom, an alkyl group, or an aryl group; and * represents a bonding site.

[Chem. 11]

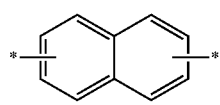

(2-4)

In formula (2-4), * represents a bonding site.

[Chem. 12]

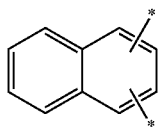

(2-5)

In formula (2-5), * represents a bonding site.

[Chem. 13]

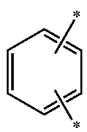

(2-6)

In formula (2-6), * represents a bonding site.

Examples of the alkyl group having from 1 to 4 carbon atoms represented by $R^7$ in formula (2-1) include alkyl groups having from 1 to 4 carbon atoms among the groups exemplified above as alkyl groups represented by $R^1$ etc.

Examples of the alkyl group having from 1 to 4 carbon atoms represented by $R^8$ in formula (2-2) include alkyl groups having from 1 to 4 carbon atoms among the groups exemplified above as alkyl groups having from 1 to 4 carbon atoms represented by $R^1$ etc.

Examples of the hydrocarbon group represented by $R^9$ in formula (2-2) include groups exemplified above as divalent hydrocarbon groups represented by $R^3$.

Examples of the alkyl group represented by $R^{1'}$, $R^{2'}$, $R^{4'}$, $R^{5'}$, and $R^{6'}$ in formula (2-3) include groups exemplified as alkyl groups represented by $R^1$ etc.

Examples of the aryl group represented by $R^{1'}$, $R^{2'}$, $R^{4'}$, $R^{5'}$, and $R^{6'}$ in formula (2-3) include groups exemplified as aryl groups represented by $R^1$ etc.

In the resin composition of the invention, from the viewpoint of flame retardancy of the cured product, it is particularly preferable that the hydrocarbon group represented by $R^3$ in formula (1) is a group represented by formula (2-1). In cases where the hydrocarbon group represented by $R^3$ is a group represented by formula (2-1), it is preferable that $R^7$ in formula (2-1) is a hydrogen atom or a methyl group. It is preferable that $R^1$ and $R^2$ in formula (1) each independently represent an ethyl group or a propyl group. A concrete example of a compound represented by formula (1) that is suitably usable in the resin composition of the invention may include a phosphorus-containing compound represented by formula (3-1) below.

[Chem. 14]

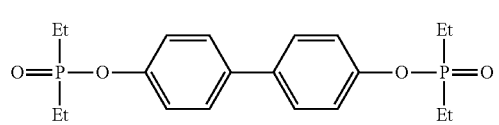

(3-1)

In the resin composition of the invention, from the viewpoint of flame retardancy of the cured product, it is also particularly preferable that the hydrocarbon group represented by $R^3$ in formula (1) is a group represented by formula (2-2). In cases where the hydrocarbon group represented by $R^3$ is a group represented by formula (2-2), it is preferable that n in formula (2-2) is 0 or 1. It is preferable that o in formula (2-2) is an integer from 0 to 5, more preferably 0. It is preferable that $R^8$ in formula (2-2) is a hydrogen atom or a methyl group. It is preferable that $R^9$ in formula (2-2) is a group represented by formula (a) below. Concrete examples of the group represented by formula (a) may include a methylene group, an ethanediyl group, or a propanediyl group. It is preferable that $R^9$ is at the para position with respect to the bonding site. Further, it is preferable that $R^1$ and $R^2$ in formula (1) each independently represent an ethyl group or a propyl group. Concrete examples of compounds represented by formula (1) that are suitably usable in the resin composition of the invention may include phosphorus-containing compounds represented by formulas (3-2) to (3-4) below.

[Chem. 14A]

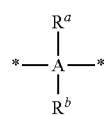

(a)

In formula (a), A represents a linear alkylene group having from 1 to 3 carbon atoms; $R^a$ and $R^b$ each independently represent a hydrogen atom or a methyl group; and * represents a bonding site.

Examples of the linear alkylene group having from 1 to 3 carbon atoms represented by A include $-(CH_2)_{n1}-$ (wherein n1 represents an integer from 1 to 3).

[Chem. 15]

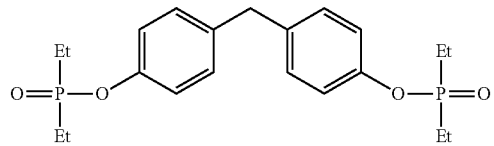

(3-2)

[Chem. 16]

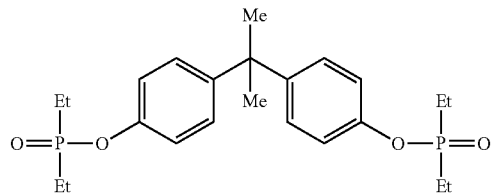

(3-3)

[Chem. 17]

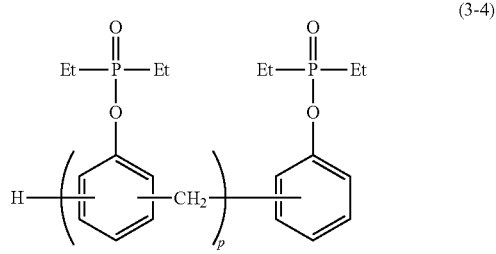

(3-4)

In formula (3-4), p represents an integer from 1 to 5.

Phosphorus-containing compounds represented by formula (1) can be manufactured according to known methods. For example, they can be manufactured according to the method described in WO2016/121750.

The content of the phosphorus-containing compound represented by formula (1) in the epoxy resin composition of the invention is not particularly limited, and may be, for example, an amount that makes the content of phosphorus originating from the phosphorus-containing compound preferably from 0.1 to 5 mass %, more preferably from 0.5 to 5 mass %, even more preferably from 1.5 to 5 mass %, further more preferably from 1.5 to 4.5 mass %, and most preferably from 1.5 to 2.5 mass %, with respect to the total solid content of the epoxy resin, the cyanate resin, the aromatic amine curing agent that is liquid at 25° C., and the phosphorus-containing compound represented by formula (1). Setting the content of the phosphorus-containing compound represented by formula (1) within the aforementioned range improves the flame retardancy and water resistance of the obtained cured product.

In the epoxy resin composition of the invention, from the viewpoint of balancing flame retardancy and physical properties, it is preferable that the blending ratio of the phosphorus-containing compound represented by formula (1) with respect to 100 parts by mass of the epoxy resin is from 1 to 300 parts by mass, more preferably from 5 to 100 parts by mass, even more preferably from 20 to 100 parts by mass. Further, it is preferable that the blending ratio of the phosphorus-containing compound represented by formula (1) with respect to 100 parts by mass of the cyanate compound is from 1 to 300 parts by mass, more preferably from 5 to 100 parts by mass, even more preferably from 20 to 100 parts by mass.

The resin composition of the invention may contain flame retardants other than the phosphorus-containing compound represented by formula (1). Examples of such flame retardants may include phosphorus-containing compounds other than the phosphorus-containing compound represented by formula (1), nitrogen-containing compounds, and boron-containing compounds.

Examples of phosphorus-containing compounds other than the phosphorus-containing compound represented by formula (1) may include: aliphatic phosphoric esters, such as trimethyl phosphate, triethyl phosphate, tributyl phosphate, trioctyl phosphate, and tributoxyethyl phosphate; aromatic phosphoric esters, such as triphenyl phosphate, cresyl diphenyl phosphate, dicresyl phenyl phosphate, tricresyl phosphate, trixylenyl phosphate, xylenyl diphenyl phosphate, tris(isopropylphenyl)phosphate, isopropylphenyl diphenyl phosphate, diisopropylphenyl phenyl phosphate, tris(trimethylphenyl)phosphate, tris(t-butylphenyl)phosphate, hydroxyphenyl diphenyl phosphate, and octyl diphenyl phosphate; condensed phosphoric esters, such as resorcinol polyphenyl phosphate, 1,3-phenylene bis(2,6-dimethylphenyl phosphate), resorcinol poly(di-2,6-xylyl)phosphate, bisphenol A polycresyl phosphate, bisphenol A polyphenyl phosphate, hydroquinone poly(2,6-xylyl)phosphate, and condensates thereof; phosphates, such as ammonium phosphate and melamine phosphate; condensed phosphates, such as ammonium polyphosphate and melamine polyphosphate; metal salts of phosphinic acid, such as aluminum trisdiethylphosphinate, aluminum trismethylethylphosphinate, aluminum trisdiphenylphosphinate, aluminum triphosphinate, zinc bisdiethylphosphinate, zinc bismethylethylphosphinate, zinc bisdiphenylphosphinate, zinc triphosphinate, titanyl bisdiethylphosphinate, titanium tetrakisdiethylphosphinate, titanyl bismethylethylphosphinate, titanium tetrakismethylethylphosphinate, titanyl bisdiphenylphosphinate, titanium tetrakisdiphenylphosphinate, and titanyl tetraphosphinate; phosphinic esters, such as phenyl diphenylphosphinate, methyl diphenylphosphinate, and 9,10-dihydro-9-oxa-10-phosphaphenanthrene-10-oxide (referred to hereinbelow as HCA); HCA-modified compounds, such as adducts of HCA and acrylic esters, adducts of HCA and epoxy resins, and adducts of HCA and hydroquinone; phosphine oxide compounds, such as diphenylvinylphosphine oxide, triphenylphosphine oxide, trialkylphosphine oxide, and tris(hydroxyalkyl)phosphine oxide; phosphazene derivatives, such as hexaphenylcyclotriphosphazene; and red phosphorus. One type of the aforementioned phosphorus-containing compound may be used singly, or two or more types may be used in combination.

Commercially available products may be used as the phosphorus-containing compounds other than the aforementioned component (D). Examples of products already available on the market include phosphorus-containing phenoxy resins (e.g., Phenotohto ERF-001M30 and TX-0924K30 from New Nippon Steel Chemical Co., Ltd.), hydroxyl group-containing phosphoric esters (e.g., DAIGUARD-580 and DAIGUARD-610 from Daihachi Chemical Industry Co., Ltd), HCA derivatives (e.g., HCA-HQ, M-Ester, and ME-P8 from Sanko Co., Ltd.), and Exolit OP930, Exolit OP935 and Exolit OP1230 (from Clariant (Japan) K. K.).

Examples of the aforementioned nitrogen-containing compounds may include silicon nitride, aluminum nitride, and compounds that form a salt of a triazine-based compound and cyanuric acid or isocyanuric acid. A salt of a triazine-based compound and cyanuric acid or isocyanuric acid refers to an adduct of a triazine-based compound and cyanuric acid or isocyanuric acid, and is usually an adduct having a 1:1 (molar ratio) composition, or a 2:1 (molar ratio) composition in some cases. Triazine-based compounds that do not form a salt with cyanuric acid or isocyanuric acid are excluded. One type of the aforementioned nitrogen-containing compound may be used singly, or two or more types may be used in combination.

Examples of the triazine-based compounds may include melamine, mono(hydroxymethyl)melamine, di(hydroxymethyl)melamine, tri(hydroxymethyl)melamine, benzoguanamine, acetoguanamine, and 2-amido-4,6-diamino-1,3,5-triazine.

Examples of the aforementioned boron-containing compounds may include: boric acid (e.g., orthoboric acid and metaboric acid); borates (e.g., alkali metal borates such as sodium tetraborate, alkaline-earth metal salts such as barium metaborate, and transition metal salts such as zinc borate, etc.); condensed boric acids (salts) (e.g., pyroboric acid, tetraboric acid, pentaboric acid, and octaboric acid, or metal salts thereof); and boron nitride. The boron-containing compounds may be hydrates (e.g., borax, which is sodium tetraborate hydrate). One type of the aforementioned boron-containing compound may be used singly, or two or more types may be used in combination.

Halogen-based flame retardants are known as common flame retardants other than the flame retardants described above. Examples of halogen-based flame retardants may include: tetrabromobisphenol A derivatives, such as tetrabromobisphenol A, carbonate oligomers of tetrabromobisphenol A, tetrabromobisphenol A bis(2,3-dibromopropyl ether), tetrabromobisphenol A bis(2-bromoethyl ether), tetrabromobisphenol A diglycidyl ether-brominated bisphenol adduct epoxy oligomer, and tetrabromobisphenol A diglycidyl ether-tribromophenol adduct; bromine-based aromatic compounds, such as decabromodiphenyl ether, octabromodiphenyl ether, ethylene bis-tetrabromophthalimide, hexabromocyclododecane, 1,2-bis(pentabromophenyl)ethane, 2,3-dibromopropylpentabromophenyl ether, 1,2-bis(2,4,6-tribromophenoxy)ethane, 2,4,6-tris(2,4,6-tribromophenoxy)-1,3,5-triazine, brominated polystyrene, polybrominated styrene, and pentabromobenzyl acrylate (monomer); chlorinated paraffin; chlorinated naphthalene; and halogen-containing phosphoric esters, such as tris(chloroethyl)phosphate, tris(2,3-dichloropropyl)phosphate, tris(2-chloropropyl)phosphate, tris(2,3-bromopropyl)phosphate, tris(bromochloropropyl)phosphate, 2,3-dibromopropyl-2,3-chloropropyl phosphate, tris(tribromophenyl)phosphate, tris(dibromophenyl)phosphate, and tris(tribromoneopentyl)phosphate.

In terms of flame retardancy, the aforementioned halogen-based flame retardants are considered as materials sufficient for improving the flame retardancy of epoxy resin composition as alternatives to the phosphorus-containing compound represented by formula (I). However, fiber-reinforced plastics using such halogen-based flame retardants tend to undergo bleeding at the time of curing, and are also known to produce toxic gases during disposal after use or in case of fire. Thus, from the viewpoint of preventing bleeding during curing and from the viewpoint of environmental suitability, it is preferable that the resin composition of the invention does not contain the aforementioned halogen-based flame retardants.

For the same reasons, it is preferable that the resin composition of the invention does not contain antimony compounds, such as antimony trioxide, which are used in combination with halogen-based flame retardants.

Preferably, the resin composition of the invention further contains an active energy ray-absorbing component. Herein, an active energy ray-absorbing component refers to a component capable of absorbing active energy rays and radiating thermal energy. Thermal energy radiated from the active energy ray-absorbing component can cure the resin composition. Examples of active energy rays may include electron beams, ultraviolet rays, infrared rays, laser beams, visible rays, ionizing radiation (X rays, α rays, β rays, γ rays, etc.), microwaves, and high-frequency waves.

The resin composition of the invention can be cured by heating. In cases where the resin composition of the invention further contains an active energy ray-absorbing component, the resin composition can be cured also by irradiation with active energy rays. In this way, the time for curing the resin composition can be made shorter. By reducing the curing time, the time required for work can be reduced. Also, curing can be achieved with less energy compared to curing by heating, thus making it economically and environmentally advantageous.

From the viewpoint of allowing the resin composition to penetrate between fibers, it is preferable that the active energy ray-absorbing component is liquid at 25° C., or becomes liquid by being compatibilized when mixed with other materials. Examples of such compounds may include aniline black, metal complexes, squaric acid derivatives, immonium dyes, polymethine, phthalocyanine-based compounds, naphthalocyanine-based compounds, perylene-based compounds, quaterrylene-based compounds, and nigrosine-based compounds. In the resin composition of the invention, from the viewpoint of easy availability, it is preferable to use a nigrosine-based compound as an active energy ray-absorbing component.

Examples of the nigrosine-based compound may include nigrosine compounds, such as nigrosine salts and nigrosine derivatives. Commercially available products may be used as the nigrosine-based compound. Examples of commercially available nigrosine-based compounds include the BONASORB series, eBIND ACW series, eBIND LTW series, eBIND LAW series, ORIENT NIGROSINE series, and NUBIAN BLACK series from Orient Chemical Industries Co., Ltd. Among the aforementioned nigrosine-based compounds, it is preferable to use herein the NUBIAN BLACK series from the viewpoint of low cost and easy availability. One type of the aforementioned nigrosine-based compound may be used singly, or two or more types may be used in combination.

The content of the active energy ray-absorbing component in the resin composition of the invention is preferably from 0.001 to 1 mass %, more preferably from 0.01 to 0.5 mass %, even more preferably from 0.05 to 0.2 mass %, in the resin composition. Setting the content of the active energy ray-absorbing component within the aforementioned range improves the balance between the curing speed of the resin composition and heat generation (burning of the composition), thus improving the curability of the resin composition.

The resin composition of the invention may contain, as necessary, other additives known in the technical field to which the present invention pertains. Examples of such additives may include additives disclosed in WO2017/038603.

Next, a fiber-reinforced plastic composition of the invention will be described. The fiber-reinforced plastic composition of the invention contains the resin composition of the invention, and a reinforcement fiber. The resin composition of the invention is suitably usable as a matrix resin of a fiber-reinforced plastic.

The type of reinforcement fiber to be contained in the fiber-reinforced plastic composition of the invention is not particularly limited, and known reinforcement fibers may be used. Concrete examples of reinforcement fibers may include carbon fiber, glass fiber, aramid fiber, boron fiber, alumina fiber, and silicone carbide fiber. In the fiber-reinforced plastic composition of the invention, one type of the aforementioned reinforcement fiber may be used singly, or two or more types may be used in combination.

The reinforcement fibers contained in the fiber-reinforced plastic composition of the invention may take the form of, for example: a tow sheet including high-strength high-modulus fibers arranged in one direction; a unidirectional woven fabric or bidirectional woven fabric including fibers arranged in one direction or two directions; a triaxial woven fabric including fibers arranged in three directions; or a multi-axial woven fabric including fibers arranged in multiple directions. In a tow sheet, it is preferable to arrange the fibers so as to provide appropriately-sized gaps between strands to improve resin impregnation to a base material.

As regards the blending ratio between the reinforcement fiber and the resin composition in the fiber-reinforced plastic composition of the invention, it is preferable that the amount of the resin composition is preferably from 5 to 150 parts by mass, more preferably from 15 to 75 parts by mass, with respect to 100 parts by mass of the reinforcement fiber. By setting the blending ratio within the aforementioned range, it is possible to obtain a fiber-reinforced plastic having excellent physical properties.

Next, a cured product of the invention will be described. The cured product of the invention is obtained by curing the resin composition of the invention. As described above, the resin composition of the invention can be cured by heating. The conditions for heating are not particularly limited, and can be determined as appropriate depending on, for example, the makeup of the resin composition. For example, heating is performed at a heating temperature within a range from 40 to 250° C., preferably from 100 to 200° C., for 10 minutes to 8 hours, preferably for 30 minutes to 5 hours.

In cases where the resin composition of the invention contains an active energy ray-absorbing component, the resin composition can be cured by being irradiated with active energy rays. Active energy rays to be used for curing the resin composition are not particularly limited, and can be selected as appropriate depending on the purpose. Examples of active energy rays may include electron beams, ultraviolet rays, infrared rays, laser beams, visible rays, ionizing radiation (X rays, α rays, β rays, γ rays, etc.), microwaves, and high-frequency waves. In the present invention, from the viewpoint of further increasing the curing speed of the resin composition, it is preferable to use laser beams and/or infrared rays, more preferably infrared rays, among the aforementioned active energy rays.

Examples of the laser beams may include: solid-state lasers using media such as ruby, glass, or YAG (yttrium aluminum garnet crystal doped with a small amount of rare-earth elements); liquid lasers using media such as solutions in which a coloring agent is dissolved in a solvent such as water or alcohol; gas lasers using media such as $CO_2$, argon, or He—Ne mixed gas; and semiconductor lasers employing recombination luminescence of semiconductors. In the present invention, it is preferable to use semiconductor lasers, which are inexpensive and allow easy output control.

The wavelengths of the laser beams used in the invention are not particularly limited; for example, the resin composition can be cured by rays within the near-infrared range (wavelengths of around 0.7 to 2.5 μm). The laser beam output is also not particularly limited; for example, the resin composition can be cured with an output in a range from 1 W to 4 kW. The laser irradiation time is also not particularly limited, and can be determined as appropriate depending on, for example, the irradiation area and output; for example, the resin composition can be cured within a range from 0.2 to 10 W/mm$^2$.

The wavelengths of the infrared rays used in the invention are not particularly limited, and can be determined as appropriate depending on the absorption range of the active energy ray-absorbing component contained in the resin composition; for example, the resin composition can be cured in such wavelength ranges as the near-infrared range (wavelengths of around 0.7 to 2.5 μm), mid-infrared range (wavelengths of around 2.5 to 4 μm), and far-infrared range (wavelengths of around 4 to 1000 μm). In cases where the active energy ray-absorbing component is a nigrosine-based compound, the resin composition can be cured in a short time within the near-infrared range (wavelengths of around 0.7 to 2.5 μm).

Examples of methods for irradiating the resin composition with infrared rays may include irradiation methods employing infrared heaters. Examples of infrared heaters may include halogen heaters, quartz heaters, sheathed heaters, and ceramic heaters. Halogen heaters can radiate infrared rays with wavelengths from the near-infrared range to the mid-infrared range; quartz heaters, sheathed heaters, and ceramic heaters can radiate infrared rays with wavelengths from the mid-infrared range to the far-infrared range. Among the aforementioned heaters, it is preferable to use a halogen heater, because the time from power-on until the heat source gets heated is short, and heating can be achieved promptly.

Next a fiber-reinforced plastic of the invention will be described. The fiber-reinforced plastic of the invention is obtained by curing the fiber-reinforced plastic composition of the invention. The fiber-reinforced plastic composition of the invention can be cured according to the same method as the resin composition of the invention, as described above.

The fiber-reinforced plastic of the invention can be molded according to any of known methods, such as extrusion molding, blow molding, compression molding, vacuum molding, injection molding, resin transfer molding (RTM), vacuum-assisted resin transfer molding (VaRTM), laminating molding, hand lay-up molding, and filament winding molding.

The fiber-reinforced plastic of the invention can be used for various kinds of uses, with examples including: structural materials for transportation equipment, such as automobiles, boats/ships, and railroad vehicles; general industrial uses, such as drive shafts, leaf springs, wind turbine blades, pressure vessels, flywheels, papermaking rollers, roof materials, cables, and repair/reinforcement materials; aerospace uses, such as fuselages, main wings, tail assemblies, rotor blades, fairings, cowlings, doors, seats, interior materials, motor cases, and antennas; and sporting uses, such as golf shafts, fishing rods, rackets for tennis, badminton, etc., sticks for hockey etc., and ski poles.

Next, a method for flame-proofing a fiber-reinforced plastic of the invention will be described. The fiber-reinforced plastic flame-proofing method of the invention involves: a step of obtaining a fiber-reinforced plastic composition by mixing the resin composition of the invention and a reinforcement fiber; and a step of curing the fiber-reinforced plastic composition. Methods for mixing the resin composition of the invention and the reinforcement fiber are not particularly limited, and can be selected as appropriate from known methods depending on, for example, the physical properties etc. of the resin composition and the reinforcement fiber. The method for curing the fiber-reinforced plastic composition is as described above.

EXAMPLES

The present invention will be described in further detail below according to examples and comparative examples. In the following examples etc., "%" refers to "percent by mass (mass %)" unless specifically stated otherwise.

Production Example 1: Synthesis of Phosphorus-Containing Compound (3-1)

A 500-mL five-neck flask provided with a stirring blade, a reflux condenser, a thermometer, a dropping funnel, and a septum was sufficiently dried and purged with nitrogen. To the five-neck flask were placed 29.8 g (0.16 mol) of 4,4'-biphenol, 34.4 g (0.34 mol) of triethylamine, and 300 mL of super-dehydrated tetrahydrofuran. To the dropping funnel was placed 47.8 g (0.34 mol) of diethylphosphinic chloride which was dropped in a manner that the reaction temperature did not exceed 50° C. After completion of dropping, the mixture was stirred overnight, to obtain a reaction solution. The obtained reaction solution was transferred to a separatory funnel, and 500 mL of chloroform and 300 mL of a saturated aqueous solution of sodium hydrogen carbonate were added thereto and stirred well. The oil and water phases were separated, and then the water phase was removed, to obtain the organic phase. The obtained organic phase was washed twice with 200 mL of distilled water, and was then dried with anhydrous magnesium sulfate; then, the solvent was removed with an evaporator, to obtain 60.6 g of phosphorus-containing compound (3-1) (yield: 96.1%). The theoretical phosphorus content in the phosphorus-containing compound (3-1) is 15.7 mass %.

Production Example 2: Synthesis of Phosphorus-Containing Compound (3-3): A 500-mL five-neck flask provided with a stirring blade, a reflux condenser, a thermometer, a dropping funnel, and a septum was sufficiently dried and purged with nitrogen. To the five-neck flask were placed 45.7 g (0.20 mol) of bisphenol A, 42.5 g (0.42 mol) of triethylamine, and 300 mL of super-dehydrated tetrahydrofuran. To the dropping funnel was placed 59.0 g (0.42 mol) of diethylphosphinic chloride which was dropped in a manner that the reaction temperature did not exceed 50° C. After completion of dropping, the mixture was stirred overnight, to obtain a reaction solution. The obtained reaction solution was transferred to a separatory funnel, and 500 mL of chloroform and 300 mL of a saturated aqueous solution of sodium hydrogen carbonate were added thereto and stirred well. The oil and water phases were separated, and then the water phase was removed, to obtain the organic phase. The obtained organic phase was washed twice with 200 mL of distilled water, and was then dried with anhydrous magnesium sulfate; then, the solvent was removed with an evaporator, to obtain 78.1 g of phosphorus-containing compound (3-3) (yield: 89.4%). The theoretical phosphorus content in the phosphorus-containing compound (3-3) is 14.2 mass %.

Resin compositions according to the Examples and Comparative Examples were produced by using the following materials.

EP-4901E: Bisphenol F-type epoxy resin; from Adeka Corporation; epoxy equivalent: 170 g/eq.

EP-4005: Epoxidized product of adduct obtained by adding an average of 5 equivalents of propylene oxide to bisphenol A; from Adeka Corporation; epoxy equivalent: 510 g/eq.

SE-300P: Glycidyl amine-type epoxy resin; from Shina T&C; epoxy equivalent: 100 g/eq.

LECy: 1,1-Bis(4-cyanatophenyl)ethane; from Lonza.

Kayahard AA: Diaminodiethyldiphenylmethane; from Nippon Kayaku Co., Ltd.

DOPO-HQ: 10-(2,5-dihydroxyphenyl)-9,10-dihydro-9-oxa-10-phosphaphenanthrene-10-oxide; from Sanko Co., Ltd.

FP-600: Condensed phosphoric ester-based flame retardant; from Adeka Corporation.

EPICRON 152: Bromine-type epoxy resin; from DIC Corporation; epoxy equivalent: 360 g/eq.

EPICRON 153: Bromine-type epoxy resin; from DIC Corporation; epoxy equivalent: 400 g/eq.

Example 1

In a 500-mL disposable cup were placed 100 g of Adeka Resin EP-4100E as the epoxy resin (A), 100 g of LECy as the cyanate resin (B), 70 g of Kayahard AA as the aromatic amine curing agent (C) that is liquid at 25° C., and 18.5 g of the phosphorus-containing compound (3-1) as the component (D), and the mixture was stirred at 25° C. for 5 minutes with a spatula. Then, the mixture was further stirred with a planetary stirrer, to obtain a resin composition.

Using a roller, 100 g of carbon fiber (UT70-20G; from Toray Industries, Inc.) was impregnated with 33 g of the obtained resin composition, to obtain a fiber-reinforced plastic composition. The obtained fiber-reinforced plastic composition was left standing in a 150° C. constant-temperature oven for 3 hours, to cure the fiber-reinforced plastic composition and obtain a fiber-reinforced plastic.

The obtained fiber-reinforced plastic was processed into a 127-mm long, 12.7-mm wide strip, to obtain a test piece. The obtained test piece was subjected to a test according to "UL 94: Tests for Flammability of Plastic Materials" from UL (Underwriters Laboratories), to evaluate flame retardancy.

Method for Evaluating Flame Retardancy:

The test piece was held vertically, a burner flame was placed in contact with the lower end of the test piece for 10 seconds and then the burner flame was removed, and the time it took for the fire that caught on the test piece to cease was measured. Then, upon cessation of the burning, a burner flame was placed in contact with the test piece for 10 seconds for the second time, and the time it took for the fire that caught on the test piece to cease was measured, like the first time. This operation was performed for five test pieces. The average value (T1) of the time it took for the fire to cease the first time for five test pieces, and the average value (T2) of the time it took for the fire to cease the second time for five test pieces, were calculated. The results are shown in Table 1. Also, the total combustion time for the five test pieces was calculated, and based on the total combustion time calculated, each plastic was ranked according to the UL-94V standard. The combustion rank V-0 is the highest rank, and flame retardancy decreases in the order of V-1 to V-2. Plastics that did not fall under any of the ranks V-0 to V-2 were considered as failures. Also, the combustion state of each test piece after the aforementioned operation was observed with the eyes; test pieces that completely burned up 100% were also considered as failures, as nonstandard articles, regardless of the values of T1 and T2. The results are shown in Table 1.

Examples 2 to 6, Comparative Examples 1 to 4, and Reference Examples 1 and 2

Test pieces of fiber-reinforced plastics and cured products according to Examples 2 to 6, Comparative Examples 1 to 4 and Reference Examples 1 and 2 were obtained as in Example 1, except that the materials shown in Table 1 were blended according to the proportions shown in Table 1. Using these obtained test pieces and cured products, the flame retardancy of each test piece and the hardness of each cured product were evaluated according to the same method as in Example 1. The results are shown in Table 1.

| | | Example 1 | Example 2 | Example 3 | Example 4 | Example 5 | Example 6 |
|---|---|---|---|---|---|---|---|
| (A) | EP-4901E | 50 | 50 | 50 | 50 | 50 | 50 |
| | EP-4005 | 50 | 50 | 50 | 50 | 50 | |
| | SE-300P | | | | | | 50 |
| (B) | Lecy | 100 | 100 | 100 | 100 | 100 | 100 |
| (C) | Kay ahard AA | 70 | 70 | 70 | 70 | 70 | 70 |
| (D) | (3-1) | 18.5 | 39.7 | 64.5 | 93.3 | | 39.7 |
| | (3-3) | | | | | 44 | |
| | DOPO-HQ | | | | | | |
| | FP-600 | | | | | | |
| | EPICRON 152 | | | | | | |
| | EPICRON 153 | | | | | | |
| Phosphorus content in resin composition (%) | | 2 | 3 | 4 | 2 | 2 | 0 |
| Flame retardancy test | T1 (sec.) | 26 | 3.8 | 4.4 | 4.4 | 6.5 | 5.2 |
| | T2 (sec.) | 0 | 0.3 | 0.5 | 0.6 | 1 | 1.4 |
| | Total combustion time (sec.) | 156 | 24.5 | 29 | 29 | 43.9 | 32.8 |
| | Combustion degree | 80-90% combustion | 30-40% combustion | 30-40% combustion | 30-40% combustion | 40-50% combustion | 30-40% combustion |
| | Combustion rank | V-1 | V-0 | V-0 | V-0 | V-0 | V-0 |

-continued

|  |  | Comparative Example 1 | Comparative Example 2 | Comparative Example 3 | Comparative Example 4 | Reference Example 1 | Reference Example 2 |
|---|---|---|---|---|---|---|---|
| (A) | EP-4901E | 50 | 50 | 50 | 50 | 21.8 | 21.8 |
|  | EP-4005 | 50 | 50 | 50 |  | 21.8 | 21.8 |
|  | SE-300P |  |  |  | 50 |  |  |
| (B) | Lecy | 100 | 100 | 100 | 100 | 100 | 100 |
| (C) | Kay ahard AA | 70 | 70 | 70 | 70 | 70 | 70 |
| (D) | (3-1) |  |  |  |  |  |  |
|  | (3-3) |  |  |  |  |  |  |
|  | DOPO-HQ |  | 70 |  |  |  |  |
|  | FP-600 |  |  | 79 |  |  |  |
|  | EPICRON 152 |  |  |  |  | 56.4 |  |
|  | EPICRON 153 |  |  |  |  |  | 56.4 |
| Phosphorus content in resin composition (%) |  |  | 2 | 2 | 0 | 0 | 0 |
| Flame retardancy test | T1 (sec.) | 24.9 | 21.4 | 20.3 | 25.1 | 2.5 | 3.3 |
|  | T2 (sec.) | 0 | 0 | 0 | 0 | 0 | 0 |
|  | Total combustion time (sec.) | 149.6 | 107.1 | 101.5 | 125.3 | 15 | 20 |
|  | Combustion degree | 100% combustion | 100% combustion | 100% combustion | 100% combustion | 30-40% combustion | 30-40% combustion |
|  | Combustion rank | Nonstandard | Nonstandard | Nonstandard | Nonstandard | V-0 | V-0 |

The results shown in Table 1 reveal that the fiber-reinforced plastics of Examples 1 to 6 produced by using the resin compositions of the invention had excellent flame retardancy, even though they did not contain any halogen-based flame retardants.

In contrast, the fiber-reinforced plastic of Comparative Example 1, which was produced by using a resin composition not containing a flame retardant, had poor flame retardancy compared to the fiber-reinforced plastics of Examples 1 to 5. Also, the fiber-reinforced plastic of Comparative Example 4, which was produced by using a resin composition not containing a flame retardant, had poor flame retardancy compared to the fiber-reinforced plastic of Example 6.

The fiber-reinforced plastics of Comparative Examples 2 and 3 were produced by using resin compositions containing known flame retardants, but had poorer flame retardancy compared to the fiber-reinforced plastics of Examples 1 to 5. This shows that it is effective to use a phosphorus-containing compound represented by formula (1) to impart excellent flame retardancy to a resin composition containing an epoxy resin and a cyanate resin.

Interlaminar Shear Strength:

A carbon fiber-reinforced plastic (CFRP) was molded by VaRTM by using carbon fiber and the resin composition obtained in Example 2. More specifically, a CFRP was molded according to the following procedure.

In a vacuum package was placed 100 g of carbon fiber (UT70-20G; from Toray Industries, Inc.). Then, the vacuum package was subjected to vacuum suction. Then, 50 g of the resin composition obtained in Example 2 was injected into the vacuum package through a vacuum pump, to impregnate the carbon fiber with the resin composition and obtain a fiber-reinforced plastic composition. The obtained fiber-reinforced plastic composition was left standing at 25° C. for 2 hours, and then left standing in a 150° C. constant-temperature oven for 2 hours to cure, to obtain a fiber-reinforced plastic.

The obtained fiber-reinforced plastic was processed into a 15-mm long, 10-mm wide strip, to obtain a test piece. The obtained test piece was subjected to a test according to the method compliant with JIS K 7078, to measure the interlaminar shear strength (MPa). The results are shown in Table 2.

The interlaminar shear strength of each of the resin compositions obtained in Example 6, Comparative Example 1, and Comparative Example 4 was evaluated in the same manner as for the resin composition obtained in Example 2. The results are shown in Table 2.

TABLE 2

|  | Example 2 | Example 6 | Comparative Example 1 | Comparative Example 4 |
|---|---|---|---|---|
| Interlaminar shear strength (MPa) | 55.6 | 68.7 | 54.8 | 47.9 |

The results shown in Table 2 reveal that the carbon fiber-reinforced plastics of Examples 2 and 6 produced by using the resin compositions of the invention had higher interlaminar shear strength compared to the carbon fiber-reinforced plastics of Comparative Examples 1 and 4. This shows that the resin composition of the invention is suitable as a matrix resin material for CFRPs.

The invention claimed is:

1. A resin composition comprising:
(A) an epoxy resin;
(B) a cyanate resin;
(C) an aromatic amine curing agent that is liquid at 25° C.; and
(D) a phosphorus-containing compound represented by formula (1) below:

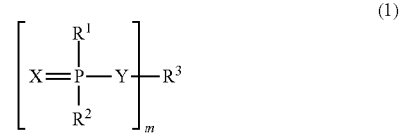

wherein, in formula (1),
m represents an integer from 1 to 10;
$R^1$ and $R^2$ each independently represent an alkyl group, an aryl group, or —$NR^4R^5$;

$R^4$ and $R^5$ each independently represent a hydrogen atom, an alkyl group, or an aryl group;

in cases where $R^1$ and $R^2$ are both —$NR^4R^5$, each $R^4$ may be the same or different from one another, and $R^5$s may be the same or different from one another;

$R^3$ represents a hydrocarbon group, wherein the hydrocarbon group may contain an atom selected from the group consisting of oxygen, sulfur, phosphorus, and nitrogen;

X represents an oxygen atom or a sulfur atom;

Y represents an oxygen atom, a sulfur atom, or —$NR^6$—; and $R^6$ represents a hydrogen atom, an alkyl group, or an aryl group, and wherein a blending ratio of the phosphorus-containing compound represented by formula (1) with respect to 100 parts by mass of the epoxy resin is from 20 to 100 parts by mass.

2. The resin composition according to claim 1, wherein $R^1$ and $R^2$ each independently represent an alkyl group or an aryl group, and X and Y are each an oxygen atom.

3. The resin composition according to claim 2, wherein the hydrocarbon group represented by $R^3$ contains at least one aromatic ring.

4. The resin composition according to claim 2, wherein m is 2, and $R^3$ is a group selected from the group consisting of formulas (2-1), (2-2), and (2-4) to (2-6) below:

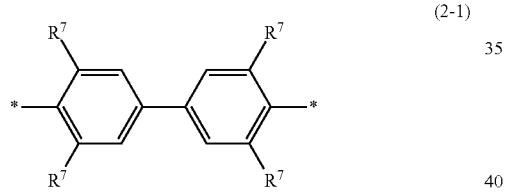

(2-1)

wherein, in formula (2-1), $R^7$ represents a hydrogen atom or an alkyl group having from 1 to 4 carbon atoms; and

* represents a bonding site;

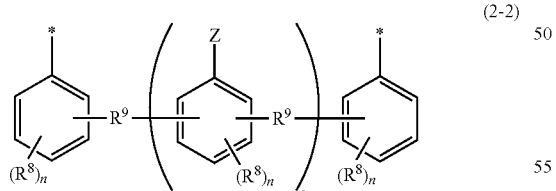

(2-2)

wherein, in formula (2-2), n represents an integer from 0 to 3;

o represents an integer from 0 to 50;

$R^8$ represents a hydrogen atom or an alkyl group having from 1 to 4 carbon atoms;

$R^9$ represents a hydrocarbon group, wherein the hydrocarbon group may contain an oxygen atom or a sulfur atom;

Z represents a hydroxyl group or a group represented by formula (2-3) below; and

* represents a bonding site;

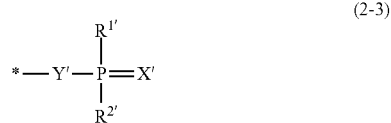

(2-3)

wherein, in formula (2-3), $R^{1'}$ and $R^{2'}$ each independently represent an alkyl group, an aryl group, or —$NR^{4'}R^{5'}$;

$R^{4'}$ and $R^{5'}$ each independently represent a hydrogen atom, an alkyl group, or an aryl group;

in cases where $R^{1'}$ and $R^{2'}$ are both —$NR^{4'}R^{5'}$, each $R^{4'}$ may be the same or different from one another, and $R^{5'}$ may be the same or different from one another;

X' represents an oxygen atom or a sulfur atom;

Y' represents an oxygen atom, a sulfur atom, or —$NR^{6'}$—;

$R^{6'}$ represents a hydrogen atom, an alkyl group, or an aryl group; and

* represents a bonding site;

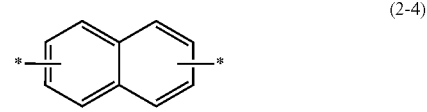

(2-4)

wherein, in formula (2-4), * represents a bonding site;

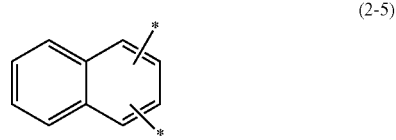

(2-5)

wherein, in formula (2-5), * represents a bonding site;

(2-6)

wherein, in formula (2-6), * represents a bonding site.

5. The resin composition according to claim 2, wherein the epoxy resin (A) contains from 20 to 80 mass % of a diglycidyl ether of bisphenol A-propylene oxide adduct.

6. The resin composition according to claim 2, wherein the phosphorus-containing compound (D) represented by formula (1) is contained in an amount that makes the content of phosphorus originating from the phosphorus-containing compound from 0.1 to 5 mass % with respect to a total solid content of the epoxy resin (A), the cyanate resin (B), the aromatic amine curing agent (C) that is liquid at 25° C., and the phosphorus-containing compound (D) represented by formula (1).

7. The resin composition according to claim 1, wherein the hydrocarbon group represented by $R^3$ contains at least one aromatic ring.

8. The resin composition according to claim 7, wherein m is 2, and $R^3$ is a group selected from the group consisting of formulas (2-1), (2-2), and (2-4) to (2-6) below:

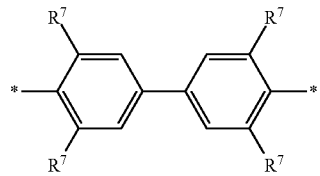
(2-1)

wherein, in formula (2-1), $R^7$ represents a hydrogen atom or an alkyl group having from 1 to 4 carbon atoms; and

* represents a bonding site;

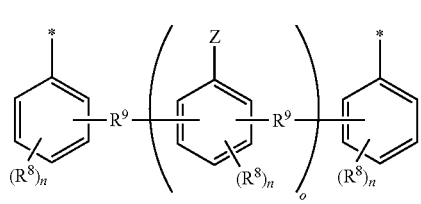
(2-2)

wherein, in formula (2-2), n represents an integer from 0 to 3;

o represents an integer from 0 to 50;

$R^8$ represents a hydrogen atom or an alkyl group having from 1 to 4 carbon atoms;

$R^9$ represents a hydrocarbon group, wherein the hydrocarbon group may contain an oxygen atom or a sulfur atom;

Z represents a hydroxyl group or a group represented by formula (2-3) below; and

* represents a bonding site;

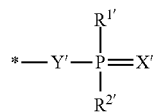
(2-3)

wherein, in formula (2-3), $R^{1'}$ and $R^{2'}$ each independently represent an alkyl group, an aryl group, or —$NR^{4'}R^{5'}$;

$R^{4'}$ and $R^{5'}$ each independently represent a hydrogen atom, an alkyl group, or an aryl group;

in cases where $R^{1'}$ and $R^{2'}$ are both —$NR^{4'}R^{5'}$, each $R^{4'}$ may be the same or different from one another, and $R^{5'}$ may be the same or different from one another;

X' represents an oxygen atom or a sulfur atom;

Y' represents an oxygen atom, a sulfur atom, or —$NR^{6'}$—;

$R^{6'}$ represents a hydrogen atom, an alkyl group, or an aryl group; and

* represents a bonding site;

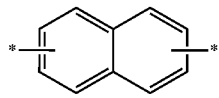
(2-4)

wherein, in formula (2-4), * represents a bonding site;

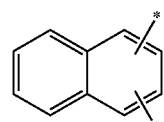
(2-5)

wherein, in formula (2-5), * represents a bonding site;

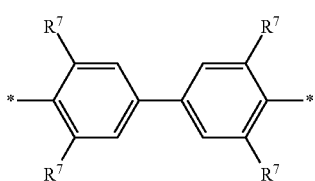
(2-6)

wherein, in formula (2-6), * represents a bonding site.

9. The resin composition according to claim 7, wherein the epoxy resin (A) contains from 20 to 80 mass % of a diglycidyl ether of bisphenol A-propylene oxide adduct.

10. The resin composition according to claim 7, wherein the phosphorus-containing compound (D) represented by formula (1) is contained in an amount that makes the content of phosphorus originating from the phosphorus-containing compound from 0.1 to 5 mass % with respect to a total solid content of the epoxy resin (A), the cyanate resin (B), the aromatic amine curing agent (C) that is liquid at 25° C., and the phosphorus-containing compound (D) represented by formula (1).

11. The resin composition according to claim 1, wherein m is 2, and $R^3$ is a group selected from the group consisting of formulas (2-1), (2-2), and (2-4) to (2-6) below:

(2-1)

wherein, in formula (2-1), $R^7$ represents a hydrogen atom or an alkyl group having from 1 to 4 carbon atoms; and

* represents a bonding site;

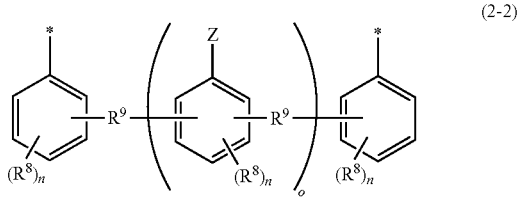
(2-2)

wherein, in formula (2-2),
n represents an integer from 0 to 3;
o represents an integer from 0 to 50;
$R^8$ represents a hydrogen atom or an alkyl group having from 1 to 4 carbon atoms;
$R^9$ represents a hydrocarbon group, wherein the hydrocarbon group may contain an oxygen atom or a sulfur atom;
Z represents a hydroxyl group or a group represented by formula (2-3) below; and
* represents a bonding site;

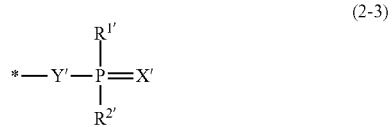
(2-3)

wherein, in formula (2-3),
$R^{1'}$ and $R^{2'}$ each independently represent an alkyl group, an aryl group, or —$NR^{4'}R^{5'}$;
$R^{4'}$ and $R^{5'}$ each independently represent a hydrogen atom, an alkyl group, or an aryl group;
in cases where $R^{1'}$ and $R^{2'}$ are both —$NR^{4'}R^{5'}$, each $R^{4'}$ may be the same or different from one another, and each $R^{5'}$ may be the same or different from one another;
X' represents an oxygen atom or a sulfur atom;
Y' represents an oxygen atom, a sulfur atom, or —$NR^{6'}$—;
$R^{6'}$ represents a hydrogen atom, an alkyl group, or an aryl group; and
* represents a bonding site;

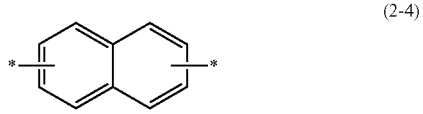
(2-4)

wherein, in formula (2-4), * represents a bonding site;

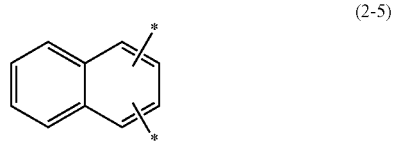
(2-5)

wherein, in formula (2-5), * represents a bonding site;

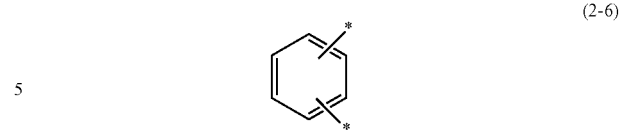
(2-6)

wherein, in formula (2-6), * represents a bonding site.

12. The resin composition according to claim 11, wherein the epoxy resin (A) contains from 20 to 80 mass % of a diglycidyl ether of bisphenol A-propylene oxide adduct.

13. The resin composition according to claim 11, wherein the phosphorus-containing compound (D) represented by formula (1) is contained in an amount that makes the content of phosphorus originating from the phosphorus-containing compound from 0.1 to 5 mass % with respect to a total solid content of the epoxy resin (A), the cyanate resin (B), the aromatic amine curing agent (C) that is liquid at 25° C., and the phosphorus-containing compound (D) represented by formula (1).

14. The resin composition according to claim 1, wherein the epoxy resin (A) contains from 20 to 80 mass % of a diglycidyl ether of bisphenol A-propylene oxide adduct.

15. The resin composition according to claim 14, wherein the phosphorus-containing compound (D) represented by formula (1) is contained in an amount that makes the content of phosphorus originating from the phosphorus-containing compound from 0.1 to 5 mass % with respect to a total solid content of the epoxy resin (A), the cyanate resin (B), the aromatic amine curing agent (C) that is liquid at 25° C., and the phosphorus-containing compound (D) represented by formula (1).

16. The resin composition according to claim 1, wherein the phosphorus-containing compound (D) represented by formula (1) is contained in an amount that makes the content of phosphorus originating from the phosphorus-containing compound from 0.1 to 5 mass % with respect to a total solid content of the epoxy resin (A), the cyanate resin (B), the aromatic amine curing agent (C) that is liquid at 25° C., and the phosphorus-containing compound (D) represented by formula (1).

17. A cured product obtained by curing the resin composition according to claim 1.

18. A fiber-reinforced plastic obtained by curing a fiber-reinforced plastic composition comprising:
the resin composition according to claim 1; and
a reinforcement fiber.

19. A method for flame-proofing a fiber-reinforced plastic, comprising:
obtaining a fiber-reinforced plastic composition by mixing the resin composition according to claim 1 and a reinforcement fiber; and
curing the obtained fiber-reinforced plastic composition.

20. A fiber-reinforced plastic composition comprising:
the resin composition according to claim 1; and
a reinforcement fiber.

* * * * *